United States Patent [19]
Kissa et al.

[11] Patent Number: 5,835,212
[45] Date of Patent: Nov. 10, 1998

[54] VARIABLE CHIRP OPTICAL MODULATOR USING SINGLE MODULATION SOURCE

[75] Inventors: Karl Kissa, Avon; Jack Lin, West Hartford, both of Conn.

[73] Assignee: Uniphase Telecommunications Products, Inc., Bloomfield, Conn.

[21] Appl. No.: 731,760

[22] Filed: Oct. 18, 1996

[51] Int. Cl.$^6$ .................................................. G01B 9/02
[52] U.S. Cl. ........................................ 356/345; 349/245
[58] Field of Search .................................... 356/345, 352; 359/127, 245, 249, 254, 276, 278, 279

[56] References Cited

U.S. PATENT DOCUMENTS 5,101,450  3/1992  Olshansky ............................... 359/127

OTHER PUBLICATIONS

"Integrated Optical SSB Modular/Frequency Shifter" by Masayuki Izutsu, Shinsuke Shikama, and Tadasi Sueta; IEEE Journal of Quantum Electronics, vol. QE–17, No. 11, Nov. 1981.

*Primary Examiner*—Robert Kim
*Attorney, Agent, or Firm*—McCormick, Paulding & Huber

[57] ABSTRACT

A variable chirp electro-optic modulator is provided that uses a single modulation signal. The modulator has several optical paths in the proximity of one or more modulation electrodes which are driven equally by a single modulation source. The amount of chirp desired of the modulator is controlled by varying the optical amplitude or phase of the light in the different paths.

20 Claims, 4 Drawing Sheets

VARIABLE CHIRP OPTICAL MODULATOR USING SINGLE MODULATION SOURCE

TECHNICAL FIELD

This invention relates to the field of electro-optical devices generally and more particularly to variable chirp modulators that employ a single source of modulation.

BACKGROUND OF THE INVENTION

An electro-optical modulator is a well known electro-optical device and is an important component of optical fiber transmissions systems. The electro-optical modulator operates by modulating a traveling optical beam with an electromagnetic signal in the radio frequency (RF) range. The RF signal interacts with the optical wave over a predetermined distance due to the construction of the optical modulator. The electric field modulates the optical wave along the interaction distance.

The Mach-Zehnder configuration is an example of a known optical modulator design. A Mach-Zehnder modulator uses an interferometric technique in order to amplitude modulate the optical wave. In sum, a Mach-Zehnder modulator splits the incoming optical beam in two, with beams propagating along separate paths in discrete optical waveguides. A radio frequency (RF) signal is utilized to modulate the optical wave in one or both of the optical waveguides. The two optical waves are then combined into a single beam and presented to the optical fiber transmission system.

With the advent of the erbium doped fiber amplifier, system problems other than signal strength have come to the fore, primarily those created by dispersion. Fiber optic transmission medium used in most optical communication links are dispersive, that is different wavelengths (or frequencies) of light travel at slightly different velocities. This effect causes optical pulses from a modulator to broaden as they travel down the fiber optic cable, causing greater difficulty at the receiver when reconstructing an electrical pulse from the received optical pulse.

The limitations imposed by dispersion have been extensively investigated. Dispersion loss within the transmission band can be minimized by dispersion shifted fibers. Alternatively, zero-chirp modulators as defined herein have been proposed to maintain constant wavelength. Techniques of dispersion equalization have been developed to compensate for the effects of dispersion on the transmitted pulses.

In general, the power at the transmitter must be increased to overcome the degradation caused by dispersion. This increase in power required to maintain error free operation is referred to as the dispersion penalty of the communication link.

When direct current modulation of optical sources is employed to generate the modulated optical signal, pulses having large uncontrolled wavelength shifts, or chirp, are produced. The chirped pulses are severely distorted after propagation through an optical fiber. While the amount of distortion generated in fiber optic transmission systems may be acceptable at current data rates, the 10 G/bit data rates which characterize the OC-192 transmission standard render current modulators useless unless accompanied by some form of chirp compensation.

If the optical modulator produces a small amount of chirp of proper magnitude and sign, that is, the frequency of the light is shifted during the rising and falling edges of the optical pulse, the dispersion penalty can be significantly reduced, due to pulse compression that occurs. The optimal amount of modulator chirp depends on length of the fiber optic cable, therefore, it is desirable that the modulator chirp be variable, in order that one modulator can be used with any length of fiber optic cable.

Previous solutions such as those disclosed in U.S. Pat. No. 5,303,079, and incorporated herein by reference, attempt to provide adjustable chirp using two independently controlled modulation sources applied to two independently driven electrodes on the same substrate. Control signals are presented to each waveguide for adjusting a modulation chirp parameter to a preselected nonzero value. The modulated optical beams are thereafter combined to form a signal output optical signal for presentation to the optical transmission system.

However, the two electrodes of the '079 modulator are close enough in proximity to cause interference effects between the two microwave fields which typically have different amplitudes. Moreover, the requirement of two modulation sources inherently doubles the electrical circuit requirements of the modulator and mandates careful temporal synchronization to ensure that the modulation pulses traverse the electrodes at the same time.

It would be advantageous to have an optical modulator capable of use in optical fiber transmission systems that provides variable chirp modulation without the complexity of two modulation sources. The present system is drawn towards such an invention.

SUMMARY OF INVENTION

An object of the present invention is to provide an electro-optic device for optical communications that has a variable chirp modulator employing a single modulation source.

Another object of the present invention is to provide an electro-optic device of the foregoing type that provides for optical adjustment of the modulator chirp.

Still another object of the present invention is to provide an electro-optic device of the foregoing type that is capable of operation at the very high data rates that characterize high speed communication systems.

Yet another object of the present invention is to provide an electro-optic device of the foregoing type in which modulator chirp is controlled by the distribution of light in different optical paths.

Still another object of the present invention is to provide a device of the foregoing type having a single-source variable chirp modulator with an extended frequency range over which chirp can be tuned without having to shift a device bias point.

According to the present invention, an electro-optic device has a first directional coupler for receiving an optical signal having an intensity and generating therefrom first and second major optical signals each having a value of power selected in response to received command signals. A first interferometer receives the first major optical signal, and includes a first interferometer input optical coupler for providing first interferometer reference and modulation optical signals; first and second first interferometer optical waveguides for respectively guiding the received first interferometer reference and modulation optical signals and a first interferometer output optical coupler for combining the first interferometer reference and modulation optical signals. There is a second interferometer receiving the second major optical signal which has a second interferometer input optical coupler for providing second interferometer reference and modulation optical signals; first and second interferometer optical waveguides for respectively guiding the received second interferometer reference and modulation optical signals and a second interferometer output optical coupler for combining the second interferometer reference and modulation optical signals. Also included is a modulator for providing, in response to received modulation control signals, a single modulation signal to optical signals propagating in modulation legs of the first and second interferometers. A second directional coupler receives modulated optical signals from the interferometers, and generates therefrom a combined modulated optical signal having a power from each of the modulated optical signals selected in response to received command signals.

According to another aspect of the present invention, an electro-optic circuit for modulating an optical beam, includes an optical source for generating an optical beam and an optical fiber transmission means for guiding said optical beam. There is an electro-optic device that has a first directional coupler for receiving an optical signal having an intensity and generating therefrom first and second major optical signals each having a value of power selected in response to received command signals. A first interferometer receives the first major optical signal, and includes a first interferometer input optical coupler for providing first interferometer reference and modulation optical signals; first and second first interferometer optical waveguides for respectively guiding the received first interferometer reference and modulation optical signals and a first interferometer output optical coupler for combining the first interferometer reference and modulation optical signals. There is a second interferometer receiving the second major optical signal which has a second interferometer input optical coupler for providing second interferometer reference and modulation optical signals; first and second interferometer optical waveguides for respectively guiding the received second interferometer reference and modulation optical signals and a second interferometer output optical coupler for combining the second interferometer reference and modulation optical signals. Also included is a modulator for providing, in response to received modulation control signals, a single modulation signal to optical signals propagating in modulation legs of the first and second interferometers. A second directional coupler receives modulated optical signals from the interferometers, and generates therefrom a combined modulated optical signal having a power from each of the modulated optical signals selected in response to received command signals. A controller is included for providing the modulation command signals in response to received modulation data signals and for providing the directional coupler command signals to select power ratios generated by the first and second directional couplers.

DESCRIPTION OF THE PREFERRED EMBODIMENT

The present invention provides a variable chirp modulator which uses a single modulation signal to modulate an optical beam transiting the device. The single modulation voltage is applied in substantially equal amplitude to one or more electrodes in the preferred embodiment. The use of a single modulation signal eliminates problems associated with having two independent modulation voltages on the same modulator, such as interference effects on propagating optical beams, that result from microwave fields of different amplitudes. In addition, the complexity of the drive electronics is reduced substantially since only one modulation voltage must be applied instead of two time-synchronized modulation signals having unequal amplitude as with known devices.

In contrast with the prior art, a chirp parameter for the modulator is adjusted by means of one or more DC voltages applied as a chirp control signal. The chirp control signal selects the magnitude of the light presented to the different legs of the modulator's interferometers. The chirp parameter for the modulator is adjustable over a range determined by individual chirp parameters for two Mach-Zehnder interferometers in the preferred embodiment. Those skilled in the art will note that the reference legs can receive some level of modulation as compared to the "modulation" leg, although typically of lesser magnitude and/or opposite sign.

Figure 1:
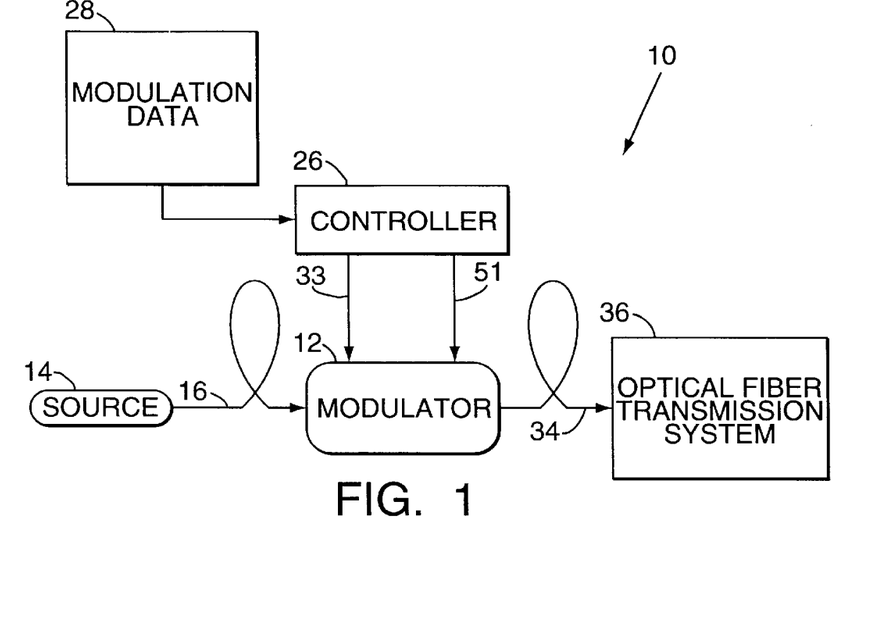
FIG. 1 is a simplified schematic illustration of an optical system having a variable chirp modulator provided in accordance with the present invention.
Figure 2:
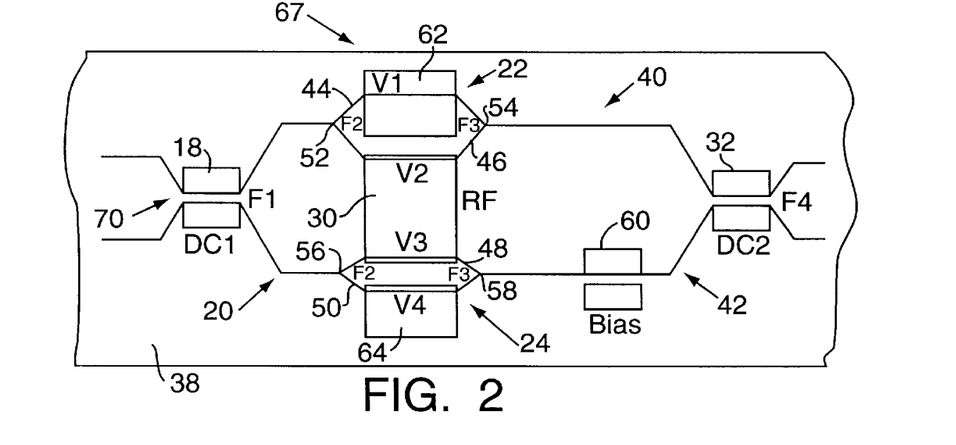
FIG. 2 is an enhanced schematic illustration of the variable chirp modulator of FIG. 1.

Referring now to FIGS. 1 and 2, there is shown a simplified schematic illustration of a fiber optic transmission system 10 having an optical modulator 12 that is an electro-optic device of a type provided in accordance with the present invention. An optical source 14 presents an optical beam to a fiber optic cable 16, which is connected to the input of the optical modulator. The optical beam is split into two signals by an input directional coupler 18 to a major interferometer 20 having within its branches two minor interferometers 22, 24. The interferometers are of a type known in the art, but are preferably of a Mach-Zehnder design.

A radio frequency (RF) modulation signal is supplied by a signal generator associated with a controller 26 in dependence on modulation command signals from a modulation data source 28. The RF energy from the modulator is conducted within the modulator by modulation electrode 30.

An output directional coupler 32 combines the two optical signals phase-shifted relative to one another into a single, amplitude modulated optical signal. Both the input and output directional couplers respectively split and combine light in accordance with received command signals presented on line 33. Fiber optic cable 34 is connected to the optical output of the modulator and delivers the modulated optical signal to the next device in the system 36.

The optical wave travels down waveguides formed in the modulator. During transit, the electrical field of the RF signal modulates the optical wave. The distance in which the RF waves interact with or modulate the optical waves is called the interaction distance, and is determined primarily by the modulator design.

The modulator includes a substrate 38 which is approximately 1000 $\mu$m thick. The length and width of substrate depend on the modulator design and should be sufficient to support the optical waveguides and the RF electrodes.

The electro-optic effect displayed by the substrate relates to the change in the index of refraction of the substrate material as compared to the magnitude of the applied electric field. The effect is small and linear for substrates suitable for the present application. It is desirable to select a substrate material with a relatively high electro-optic coefficient. Accordingly, lithium niobate ($LiNbO_3$) was chosen, although other electro-optic materials, such as gallium arsenide (GaAs) may also be used.

The electro-optic effect in $LiNbO_3$ depends on the direction of the electric field relative to the orientation of the crystalline structure of the substrate along which the optical wave will propagate. There are two practical selections. The first is a crystallographic orientation where the optic axis is parallel to plane of the substrate and at right angles to the direction propagation of the optical wave, called an X-cut. The second is where the optic axis is normal to the of the substrate, referred to as a Z-cut. For the present application, Z-cut lithium niobate ($LiNbO_3$) is selected. Regardless, the applied electric field for maximum electro-optic interaction is in the direction of the optic axis.

As noted hereinabove, the preferred modulator includes first and second minor Mach-Zehnder interferometers formed by optical waveguides in respective legs 40, 42 of the major Mach-Zehnder interferometer. Each minor interferometer has optical waveguides 44, 46 and 48, 50. All of the optical waveguides are fabricated within the substrate, although alternative embodiments using ridge waveguides can be substituted.

The waveguides are preferably created by diffusing titanium into the substrate. In conformance with conventional practice, titanium is deposited as a strip on the surface of the crystal. Thereafter, the temperature of the substrate is raised so that the titanium diffuses into the substrate to form the channels that act as waveguides. The waveguides are approximately seven (7) microns wide and approximately three (3) microns deep.

Fiber optic transmission media used in most optical communication links are dispersive, that is different wavelengths (or frequencies) of light travel at slightly different velocities. This effect causes optical pulses from a modulator to broaden as they travel down the fiber optic cable, causing greater difficulty at the receiver when reconstructing an electrical pulse from the received optical pulse. In general, the power at the transmitter must be increased to overcome the degradation caused by dispersion. This increase in power required to maintain error free operation is referred to as the dispersion penalty of the communication link.

If the optical modulator produces a small amount of chirp of proper magnitude and sign, that is, the frequency of the light is shifted during the rising and falling edges of the optical pulse, the dispersion penalty can be significantly reduced, due to pulse compression that occurs. The optimal amount of modulator chirp depends on length of the fiber optic cable, therefore, it is desirable that the modulator chirp be variable, in order that one modulator can be used with any length of fiber optic cable.

A variable chirp modulator provided in accordance with the present invention comprises several optical paths as embodied by the optical waveguides of the minor interferometers. These waveguides are fabricated in the proximity of the modulation electrode(s) which is driven by a single modulation source. By varying the optical amplitude or phase of the light in the different optical paths, the chirp of the modulator is varied. This preferably accomplished by directional coupler command signals provided to the modulator on line 51. Those skilled in the art will note that the reference legs of the minor interferometers can receive some level of modulation as compared to the modulation legs, although typically of lesser magnitude and/or opposite sign.

The four optical paths in the vicinity of the electrode of the preferred embodiment carry the modulation signal and provide adjustable chirp. Other numbers of optical paths are possible in alternative embodiments. However, the preferred design yields a net optical phase shift which is nearly linear with modulation voltage; a feature which makes the variable chirp modulator operate in a manner equivalent to fixed chirp, Mach-Zehnder modulators.

The four optical waveguides of the minor Mach-Zehnder interferometers are all preferably formed with single mode optical waveguides. It is possible to use a combination of single or multi-mode waveguides or even discrete optics to perform the same task. However, the embodiment of FIG. 1 is preferable because of fabrication considerations.

The minor interferometers, employ Y-junctions 52, 54, 56, 58 to split the received optical beam as described hereinabove with respect to the major interferometer. Other power splitting/combining elements may be equivalently substituted. The input and output Y-junctions of the minor interferometers have power split ratios, respectively designated F2 and F3, of typically 50%.

The total optical power flowing through the modulator is split between the minor interferometers by adjusting the power split ratios, F1 and F4, of the two electro-optically controlled, input and output directional couplers. Note that other types of adjustable power dividing/combining elements, such as 1×2 couplers, can also be used instead of the more conventional 2×2 directional coupler switch of the embodiment of FIG. 2.

In the preferred embodiment there is a "bias" electrode 60 after minor interferometer 24 which compensates for the phase shift through each coupler and any path length imbalance between the legs of the major interferometer. Typically, the bias electrode is set in order that light passing through the lower arm (in the Figure) of the major Mach-Zehnder interferometer experiences an extra $\pi$ phase shift relative to the upper arm in order to cancel the $\pi/2$ phase shifts encountered when coupling across the directional couplers.

The modulation signal voltage is applied to the modulation electrode which has on each side ground electrodes 62, 64 in order to form a Coplanar Waveguide (CPW) structure 67. The electric field generated by the CPW overlaps the optical waveguides of the minor interferometers, generating a phase shift proportional to voltage. The positions of the optical waveguides relative to each other and the electrodes are chosen in order that some of the phase shifts are different in each of the optical waveguides. The relative positions of the waveguides in the minor interferometers to the electrodes can be seen in the simplified sectional illustration of FIG. 3.

Figure 3:
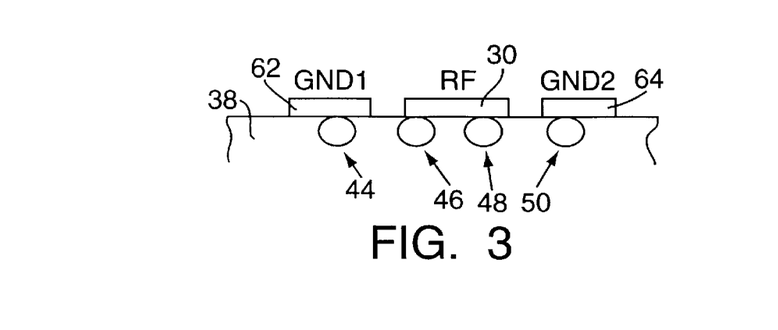
FIG. 3 is a simplified schematic sectioned illustration of the modulator of FIG. 1 showing the relative location of several optical waveguides.

The values V1, V2, V3, and V4 represent the phase shifts in each optical waveguide in a minor interferometer arm in units of $\pi$ relative to the drive voltage on the modulation electrode. The waveguide positions are chosen in order that the voltage change from the "off" to "on" state ($V_\pi$) is the same for each minor interferometer, whereas the chirp parameter of the light at the output of each minor interferometer is different.

The chirp parameter, $\alpha$, is defined by the following equation:

$$\alpha = (d\phi/dt)/(dI/dt)/2I$$

where I and $\phi$ are the instantaneous intensity and phase, respectively, of the light output by a modulator. This parameter is usually defined for the small signal case. For example, if V1=−0.05, V2=0.95, V3=0.5, and V4=−0.5, then $V_\pi$ is the same whereas the chirp parameters for the first and second minor interferometers ($\alpha_1$ and $\alpha_2$) are −0.9 and 0.0, respectively.

Figure 4:
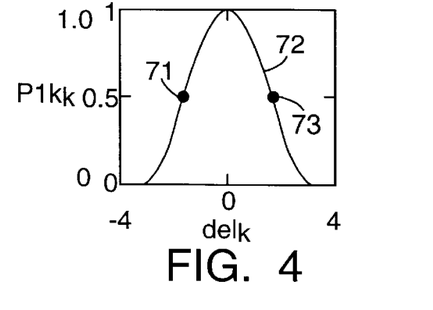
FIG. 4 is a diagrammatic illustration of intensity of light output from the modulator of FIG. 2 at zero chirp.

The chirp parameter of the entire modulator, $\alpha$, can be adjusted from −0.9 to 0.0 by adjusting the power split ratios F1 and F4. The power split ratio F1 is selected by the input directional coupler and power split ratio F4 by the output directional coupler. By shifting the bias points for the minor interferometers by $\pi$, $\alpha$ can be adjusted from 0.0 to 0.9. Such a shift in the bias point corresponds to a bias point change on the intensity versus applied modulation signal transfer function to bias point with equivalent intensity magnitude but on a curve portion having opposite slope. For example in FIG. 4, points 71, 73 are shifted by $\pi$. Those versed in the art will note that bias points 71, 73 in FIG. 4 are used for chirp parameter measurement, which is typically done with a modulation signal of small amplitude. The modulator may be biased at other points when a large amplitude digital modulation signal is applied to the modulator. Note that the digital signal must be inverted when shifting the bias point to change sign of the chirp. For example, if a positive change in modulation voltage is required during the rising edge of the digital pulse for positive chirp, then a negative voltage change will be needed when the modulator is biased for negative chirp.

Figure 6:
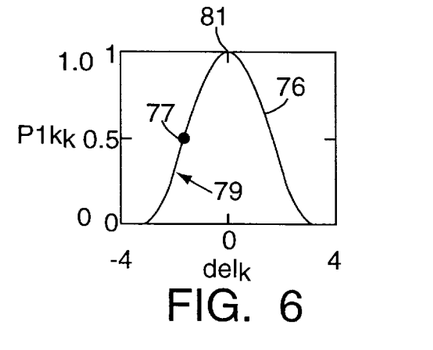
FIG. 6 is a diagrammatic illustration of intensity of light output from the modulator of FIG. 2 at a small value of chirp.

Note that the minor interferometers must be fabricated in such a way that their bias points are matched. That is, the minor interferometers are fully on or fully off at the same modulation voltage. In operation, the chirp parameter is selected to have a range so that the slope of the intensity versus applied modulation signal transfer function does not change sign; e.g. bias point 77 remains on a selected curve portion 79 of the transfer function peak 81, as seen in FIG. 6.

Only one electrode carries the modulation signal in the preferred embodiment, although more than one electrode could be used to carry the modulation signal as long as all such electrodes are driven with the same modulation signal. Equal signal amplitudes are maintained on the electrodes carrying the modulation voltage in order to prevent RF interference effects from degrading modulator performance.

FIGS. 4 through 13 show the calculated intensity and phase of the light output from the modulator for different values of power split ratios, F1 and F4. The intensity and phase are shown relative to the modulation signal. If F1=F4=0, and the input beam is provided to the modulator via port 70 of the input directional coupler, then all of the light in the modulator travels through minor interferometer 24 for whose arms have equal but opposite phase modulation, hence $\alpha=0$.

At the other extreme, if F1=F4=1.0, all of the light in the modulator travels through minor interferometer 22 for whose arms have unequal phase modulation, producing a modulator chirp parameter value $\alpha=-0.9$. For other power split ratios, the chirp parameter is adjusted between 0.0 and −0.9. Note that there is no excess optical loss or degradation of extinction introduced by the present invention. In addition, the phase of the output beam is linear with applied voltage for all power split ratios.

Figure 5:
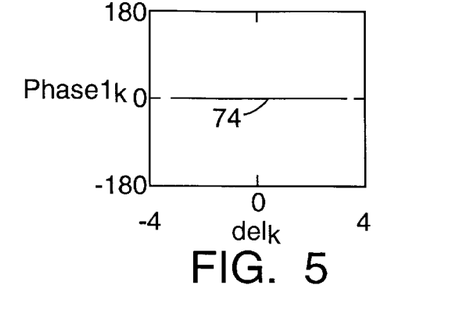
FIG. 5 is a diagrammatic illustration of phase of light output from the modulator of FIG. 2 at zero chirp.

In FIGS. 4 and 5, curves 72, 74 respectively correspond to the transfer function of intensity (P1$k_k$) and phase (Phase1$_k$) vs. applied modulation signal (del$_k$) for the case of zero chirp and power split ratio equal to zero (F1=F4=0), $\alpha=0$ at del$_k$=$\pi/2$.

Figure 7:
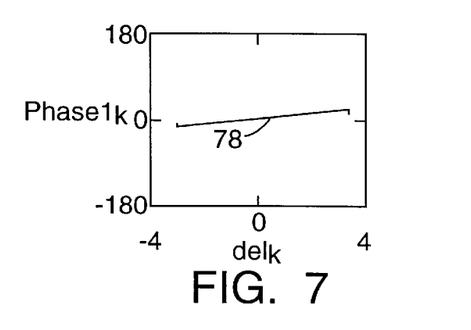
FIG. 7 is a diagrammatic illustration of phase of light output from the device of FIG. 2 at a small value of chirp.
Figure 8:
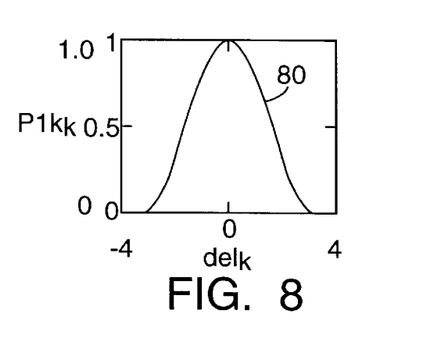
FIG. 8 is a diagrammatic illustration of intensity of light output from the modulator of FIG. 2 at a first moderate value of chirp.
Figure 9:
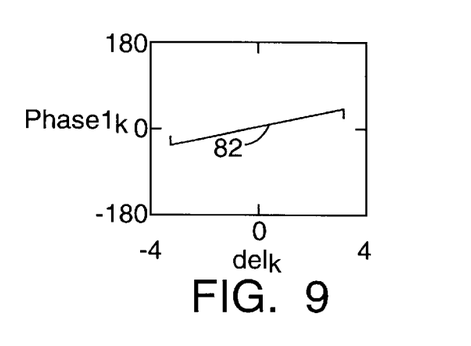
FIG. 9 is a diagrammatic illustration of phase of light output from the modulator of FIG. 2 at a first moderate value of chirp.

Curves 76, 78 of FIGS. 6 and 7 respectively correspond to the transfer function of intensity (P1$k_k$) and phase (Phase1$_k$) vs. applied modulation signal (del$_k$). In this case corresponding to a small value of chirp, the power split ratio F1=F4, is equal to 0.25. The value of the modulator chip parameter, $\alpha$, is equal to −0.2 at del$_k$=$\pi/2$.

For a situation of moderate chirp, power split ratio is set: F1=F4=0.5. The transfer functions for this case is demonstrated by curves 80 and 82 of FIGS. 8 and 9. Curve 80 corresponds to the transfer function of intensity (P1$k_k$) vs. applied modulation signal (del$_k$) and curve 82 that of phase (Phase1$_k$) vs. applied modulation signal (del$_k$). The modulator chirp parameter ($\alpha=-0.4$ at del$_k$=$\pi/2$.

Figure 10:
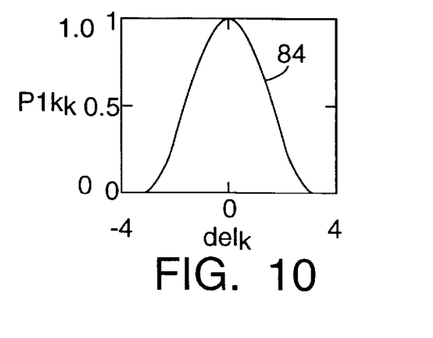
FIG. 10 is a diagrammatic illustration of intensity of light output from the modulator of FIG. 2 at a second moderate value of chirp.
Figure 11:
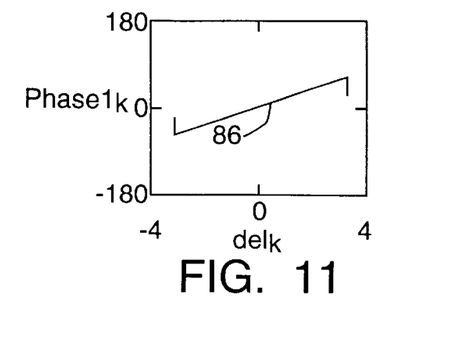
FIG. 11 is a diagrammatic illustration of phase of light output from the modulator of FIG. 2 at a second moderate value of chirp.

The response of the modulator for a second case of moderate chirp is seen in FIGS. 10, 11. The transfer functions of intensity (P1$k_k$) and phase (Phase1$_k$) vs. applied modulation signal (del$_k$) are demonstrated by curves 84, 86. The value of the chirp parameter, $\alpha$, for a power split ratio, F1=F4=0.75, is equal to −0.6 at del$_k$=$\pi/2$.

Figure 12:
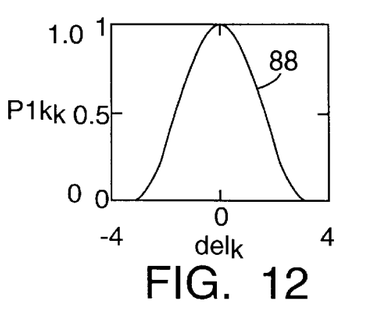
FIG. 12 is a diagrammatic illustration of intensity of light output from the modulator of FIG. 2 at a large value of chirp.
Figure 13:
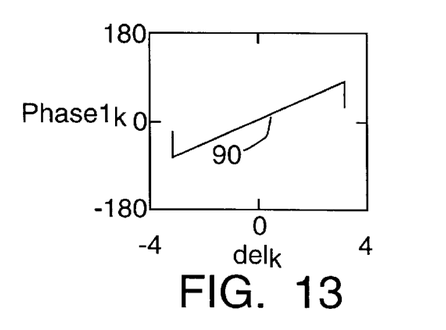
FIG. 13 is a diagrammatic illustration of phase of light output from the modulator of FIG. 2 at a large value of chirp.

FIGS. 12, 13 demonstrate the modulator's response to strong chirp, with a power split ratio, F1=F4=1.0, and modulator chirp parameter $\alpha$ set to −0.9 at del$_k$=$\pi/2$. The transfer function of intensity (P1$k_k$) vs. applied modulation signal (del$_k$) is shown by curve 88 while that of phase (Phase1$_k$) vs. applied modulation signal (del$_k$) is seen by curve 90.

Figure 14:
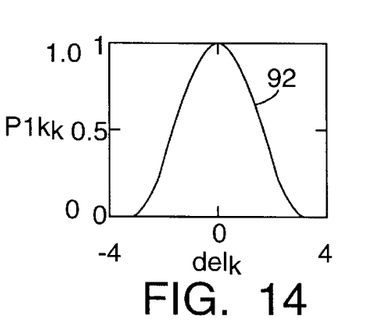
FIG. 14 is a diagrammatic illustration of intensity of light output from the modulator of FIG. 2 at a third moderate value of chirp.
Figure 15:
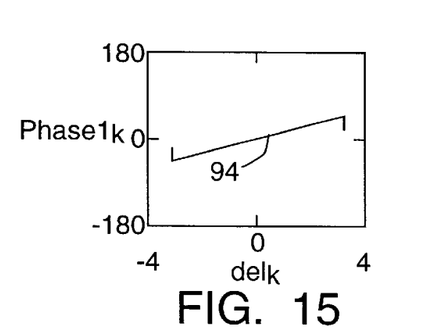
FIG. 15 is a diagrammatic illustration of phase of light output from the modulator of FIG. 2 at a third moderate value of chirp.

With the present modulator, the chirp parameter for the entire modulator is not extremely sensitive to the values of V1 through V4. Curves 92 and 94 shown respectively in FIGS. 14 and 15 demonstrate another example of moderate chirp wherein the power split ratio is set to 0.5 and the modulator chirp parameter is $\alpha=-0.5$ at del$_k$=$\pi/2$. The transfer functions are intensity (P1k$_k$) vs. applied modulation signal (del$_k$) shown by curve 92 and phase (Phase1$_k$) vs. applied modulation signal (del$_k$) illustrated by curve 94. In the example demonstrated in FIGS. 14 and 15, V3 is altered from its previous value of 0.5 to 0.6 and V4 changes from −0.5 to −0.4. The chirp parameter, α, changes from the previous example of value of −0.4 to −0.5. With these V3 and V4, the range of chirp parameter is adjustable over a smaller range, from −0.2 to −0.9 instead of 0.0 to −0.9, the range of the examples shown with respect to FIGS. 4–13.

Figure 16:
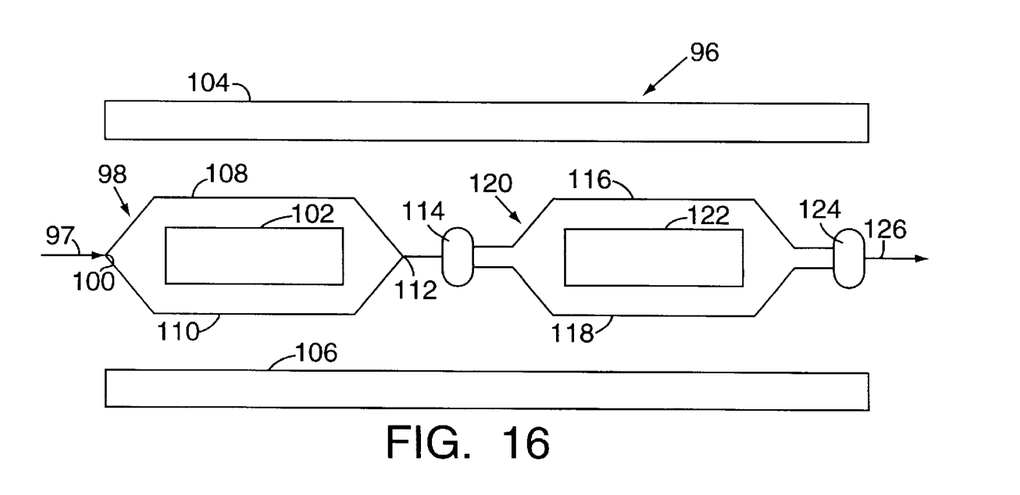
FIG. 16 is a simplified schematic illustration of an alternative embodiment of the present invention in a cascaded modulator.

FIG. 16 schematically shows an alternative embodiment of the present invention characterized by a cascaded interferometer design. A cascaded modulator 96 is similar to the embodiment of FIG. 2 but separates the modulation of the optical signal from chirp compensation without the use of a major interferometer.

An input optical beam 97 is presented to a first interferometer 98 and split into two equal signals by a Y-junction 100. An RF modulation signal from an external signal generator is presented to a central modulation electrode 102. External ground electrodes 104, 106 are fabricated adjacent to optical waveguides 108, 110. The energy from the modulation signal is communicated with both of these optical waveguides. A second Y junction 112 recombines the modulated signals before presentation to a first directional coupler 114.

The first directional coupler presents optical power of a selected magnitude to legs 116, 118 of a second interferometer 120. The interferometers are of a type known in the art, but are preferably of a Mach-Zehnder design. The optical waveguides which comprise legs 116, 118 encompass a modulation electrode 122 which receives the same modulation signal as does modulation electrode 102. Similarly, the second interferometer is bounded by ground electrodes 104, 106.

An output directional coupler 124 combines the two optical signals phase-shifted relative to one another into a single, amplitude modulated optical signal for presentation to a fiber optic cable 126. The modulator chirp parameter, α, is selected as in the preferred embodiment by varying the power split ratio between the input and output directional couplers.

Three (or more) interferometers can be incorporated in a single-source variable chirp modulator provided by the present invention in order to extend the frequency range over which chirp can be tuned without having to shift the bias point of the device. Referring now to the FIG. 17, there is schematically shown a second alternative embodiment of the present invention as modulator 128. The modulator includes a subassembly 130 encompassed within the larger dashed box which is substantially equivalent to the single source variable chirp modulator described hereinabove. The subassembly has two interferometers 142, 144 as well as input and output directional couplers 146, 148. Interferometers 142, 144 each have reference and modulation legs indicated by waveguides 162, 164 and 166, 168.

Figure 17:
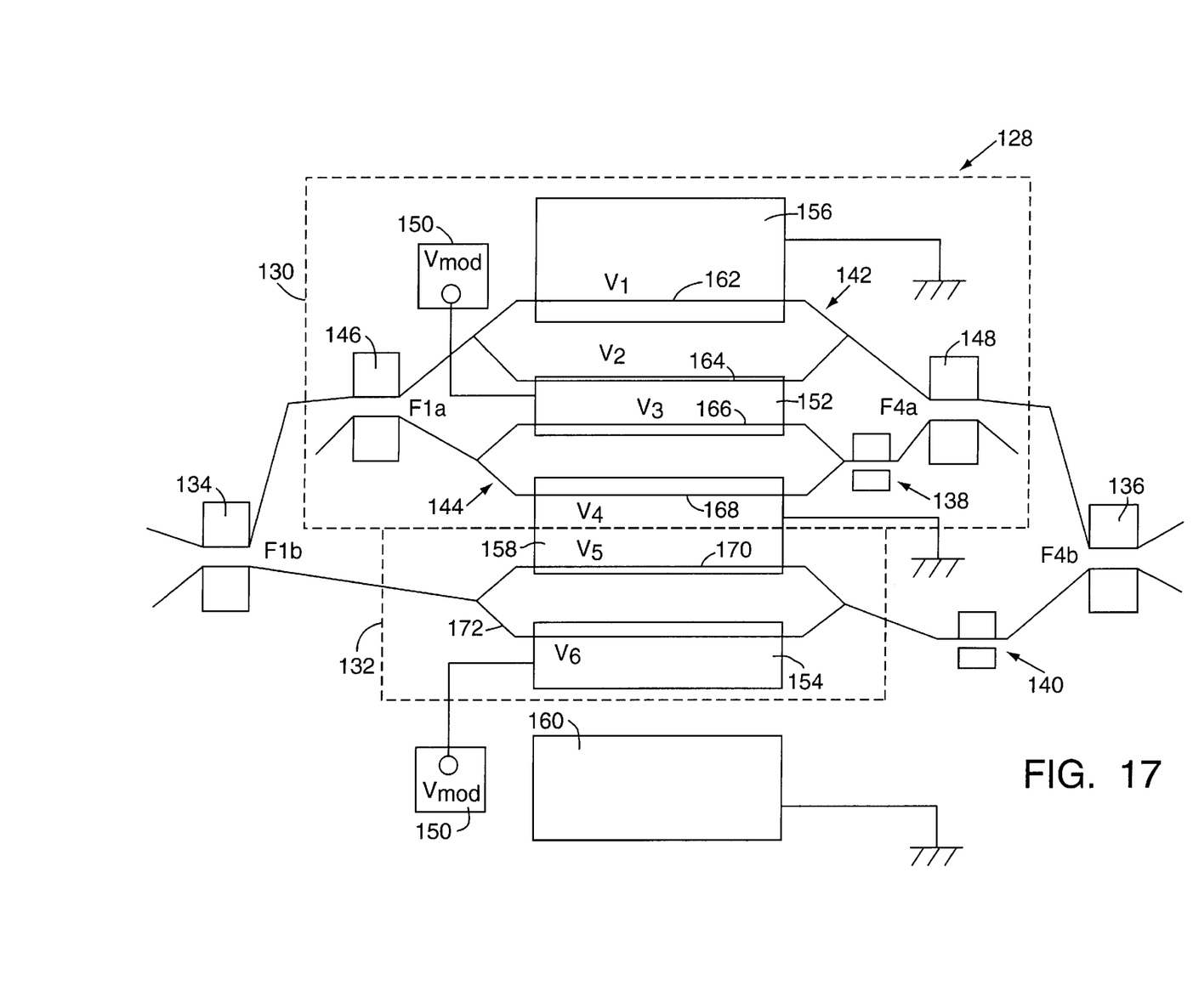
FIG. 17 is a simplified schematic illustration of a second alternative embodiment of the present invention characterized by an extended frequency range over which chirp can be tuned.

The modulator 128 also includes a supplemental interferometer 132 of the type described hereinabove and contained within the smaller dashed box and which has reference and modulation legs indicated by waveguides 170, 172. Light from modulator input directional coupler 134 is presented to both the subassembly 130 and interferometer 132 in accordance with a desired power split ratio F1 b.

There is a modulator output directional coupler 136 which receives light from the subassembly 130 and interferometer 132 and combines the same in accordance with a power split ratio F4b. The modulator 128 also includes bias electrodes, 138 and 140 which receive bias control signals to compensate for the phase shift through each coupler as well as any path length imbalance between legs of the interferometers, as described hereinabove.

As with the embodiment of FIG. 2, the values V1–V6 represent the respective phase shifts in each optical waveguide in an interferometer arm in units of π relative to the drive voltage on the modulation electrode. The waveguide positions are chosen in order that the voltage change from the "off" to "on" state (V$_π$) is the same for each minor interferometer, whereas the chirp parameter of the light at the output of each minor interferometer is different.

If the power split ratios F1b and F4b are set to 1.0, all of the optical power is routed through the subassembly, and the operation of the device is as described with respect to the FIG. 2 embodiment. For example, if V1=−0.05, V2=0.95, V3=0.5, and V4=−0.5, then the chirp parameter α can be adjusted to any value between −0.9 and 0.0, by selecting the split ratios F1a and F4a from 1.0 to 0.0.

The α parameter values of opposite sign can be selected without changing the bias point and inverting the modulation signal by diverting some or all of the optical power to interferometer 132. For example, if V5=0.05 and V6=−0.95, chirp parameter values between 0.0 and 0.9 can be selected by choosing split ratios F1b and F4b between 1.0 and 0.0. The split ratios F1a and F4a are set to 0.0 when F1b and F4b are less than 1.0. That is, the subassembly is set to have a chirp parameter of 0.0 when optical power is diverted to the interferometer 132 in order to maintain linearity of the optical phase vs. modulator signal transfer function.

Note that the modulation signal, V$_{mod}$, from source 150 is applied to two electrodes 152, 154 instead of one in the embodiment of FIG. 2. However, the voltages on those electrodes are equal in amplitude, in order to prevent interference effects. Also shown in the Figure are ground electrodes 156, 158 and 160.

Similarly, although the invention has been shown and described with respect to a preferred embodiment thereof, it would be understood by those skilled in the art that other various changes omissions and additions thereto may be made without departing from the spirit and scope of the present invention.

We claim:

1. An electro-optic device for providing a modulated output optical signal, said device comprising:

a first directional coupler means for receiving an optical signal having an intensity and generating therefrom first and second major optical signals each having a value of power selected in response to received command signals;

a first interferometer receiving said first major optical signal, and including a first interferometer input optical coupler for providing first interferometer reference and modulation optical signals;

first and second optical waveguides for respectively guiding said received first interferometer reference and modulation optical signals; and a first interferometer output optical coupler for combining said first interferometer reference and modulation optical signals;

a second interferometer receiving said second major optical signal, and including a second interferometer input optical coupler for providing second interferometer reference and modulation optical signals;

third and fourth optical waveguides for respectively guiding said received second interferometer reference and modulation optical signals; and a second interferometer output optical coupler for combining said second interferometer reference and modulation optical signals;

a modulation means for providing, in response to received modulation control signals, a single modulation signal to optical signals propagating in modulation legs of said first and second interferometers, said single modulation signal having asymmetric phase modulation magnitudes in said first and second interferometer modulation legs; and a second directional coupler means for receiving modulated optical signals from said interferometers, and generating therefrom a combined modulated optical signal having a power from each of said modulated optical signals selected in response to received command signals.

2. The electro-optic device of claim 1 wherein said modulator means comprises a central electrode communicating with an optical waveguide of each of said first and second interferometers modulation legs, with a ground electrode communicating with the optical waveguides in said first and second interferometer's remaining legs.

3. The electro-optic device of claim 1 further comprising a bias electrode for providing optical phase shift for compensation of an optical path length difference between said first and second interferometers.

4. The electro-optic device of claim 1 wherein said first and second interferometers each further comprise input and output Y junctions configured such that the optical power transiting each of said interferometers is configured in a power split ratio of approximately 50%.

5. The electro-optic device of claim 1 further comprising an electro-optic substrate on which is fabricated each of said interferometers.

6. The electro-optic device of claim 1 wherein said modulation means further comprises a modulation electrode which has on each side ground electrodes in order to form a Coplanar Waveguide (CPW) structure.

7. The electro-optic device of claim 5 wherein said substrate is comprised of lithium niobate ($LiNbO_3$).

8. The electro-optic device of claim 1 further comprising a major interferometer adapted to receive said first and second major optical signals in first and second major interferometer legs, respectively.

9. An electro-optic device for providing a modulated output optical signal, said device comprising:

a first interferometer receiving an optical signal having an intensity, and including
  a first interferometer input optical coupler for providing first interferometer reference and modulation optical signals;
  first and second optical waveguides for respectively guiding said received first interferometer reference and modulation optical signals; and
  a first interferometer output optical coupler for combining said first interferometer reference and modulation optical signals;

a first directional coupler means receiving a modulated first interferometer output signal and generating therefrom first and second major optical signals each having a value of power selected in response to received command signals a second interferometer receiving said major optical signals, and including
  a second interferometer input optical coupler for providing second interferometer reference and modulation optical signals;
  third and fourth optical waveguides for respectively guiding said received second interferometer reference and modulation optical signals; and
  a second interferometer output optical coupler for combining said second interferometer reference and modulation optical signals;

a modulation means for providing, in response to received modulation control signals, a single modulation signal to optical signals propagating in modulation legs of said first and second interferometers, said single modulation signal having asymmetric phase modulation magnitudes in said first and second interferometer modulation legs; and a second directional coupler means for receiving modulated optical signals from said second interferometer, and generating therefrom a combined modulated optical signal having a power from each of said modulated optical signals selected in response to received command signals.

10. The electro-optic device of claim 9 wherein said second directional coupler means receives said modulated optical signals directly from said second interferometer.

11. The electro-optic device of claim 1 wherein said optical waveguides are single mode.

12. An electro-optic circuit for modulating an optical beam, said circuit comprising:

an optical source for generating an optical beam;

an optical fiber transmission means for guiding said optical beam;

an electro-optic device including
  a first directional coupler means for receiving an optical signal having an intensity and generating therefrom first and second major optical signals each having a value of power selected in response to received command signals;
  a first interferometer receiving said first major optical signal, and including
    a first interferometer input optical coupler for providing first interferometer reference and modulation optical signals;
    first and second optical waveguides for respectively guiding said received first interferometer reference and modulation optical signals; and
    a first interferometer output optical coupler for combining said first interferometer reference and modulation optical signals;
  a second interferometer receiving said second major optical signal, and including
    a second interferometer input optical coupler for providing second interferometer reference and modulation optical signals;
    third and fourth optical waveguides for respectively guiding said received second interferometer reference and modulation optical signals; and
    a second interferometer output optical coupler for combining said second interferometer reference and modulation optical signals;
  a modulation means for providing, in response to received modulation control signals, a single modulation signal to optical signals propagating in modulation legs of said first and second interferometers, said single modulation signal having asymmetric phase modulation magnitudes in said first and second interferometer modulation legs; and a second directional coupler means for receiving modulated optical signals from said interferometers, and generating therefrom a combined modulated optical signal having a power from each of said modulated optical signals selected in response to received command signals.

13. An electro-optic circuit for modulating an optical beam, said circuit comprising:

an optical source for generating an optical beam;

an optical fiber transmission means for guiding said optical beam;

an electro-optic device including
a first interferometer receiving an optical signal having an intensity, and including
a first interferometer input optical coupler for providing first interferometer reference and modulation optical signals;
first and second optical waveguides for respectively guiding said received first interferometer reference and modulation optical signals; and
a first interferometer output optical coupler for combining said first interferometer reference and modulation optical signals;
a first directional coupler means receiving a modulated first interferometer output signal and generating therefrom first and second major optical signals each having a value of power selected in response to received command signals
a second interferometer receiving said major optical signals, and including
a second interferometer input optical coupler for providing second interferometer reference and modulation optical signals;
third and fourth optical waveguides for respectively guiding said received second interferometer reference and modulation optical signals; and
a second interferometer output optical coupler for combining said second interferometer reference and modulation optical signals;
a modulation means for providing, in response to received modulation control signals, a single modulation signal to optical signals propagating in modulation legs of said first and second interferometers, said single modulation signal having asymmetric phase modulation magnitudes in said first and second interferometer modulation legs; and
a second directional coupler means for receiving modulated optical signals from said second interferometer, and generating therefrom a combined modulated optical signal having a power from each of said modulated optical signals selected in response to received command signals.

14. The circuit of claim 12 wherein said second directional coupler means receives said modulated optical signals directly from said second interferometer.

15. The circuit of claim 12 further comprising a modulation data source for providing said modulation data signals.

16. The electro-optic device of claim 5 wherein said substrate is comprised of gallium arsenide (GaAs).

17. The electro-optic device of claim 1 wherein said optical waveguides are multi-mode.

18. The electro-optic circuit of claim 12 further comprising a phase shift compensation means for providing compensation for phase shift through each of said directional coupler means and path length imbalance between said interferometers.

19. An electro-optic device for providing a modulated output optical signal, said device comprising:

a first directional coupler means for receiving an optical signal having an intensity and generating therefrom first and second major optical signals each having a value of power selected in response to received command signals;

a first interferometer receiving said first major optical signal, and including
a first interferometer input optical coupler for providing first interferometer reference and modulation optical signals;
first and second optical waveguides for respectively guiding said received first interferometer reference and modulation optical signals; and
a first interferometer output optical coupler for combining said first interferometer reference and modulation optical signals;

a second interferometer receiving said second major optical signal, and including
a second interferometer input optical coupler for providing second interferometer reference and modulation optical signals;
third and fourth optical waveguides for respectively guiding said received second interferometer reference and modulation optical signals; and
a second interferometer output optical coupler for combining said second interferometer reference and modulation optical signals;

a modulation means for providing, in response to received modulation control signals, a single modulation signal to optical signals propagating in modulation legs of said first and second interferometers, said single modulation signal having asymmetric phase modulation magnitudes in said first and second interferometer modulation legs;

a second directional coupler means for receiving modulated optical signals from said interferometers, and generating therefrom a combined modulated optical signal having a power from each of said modulated optical signals selected in response to received command signals;

primary input directional coupler means for receiving said optical signal prior to the presentation thereof to said first interferometer and for generating therefrom first and second primary major optical signals each having a value of power selected in response to received primary command signals, said first primary major optical signal presented to said first interferometer first directional coupler means;

a supplemental interferometer receiving said second primary major optical signal, and including
a supplemental interferometer input optical coupler for providing supplemental interferometer reference and modulation optical signals;
first and second supplemental interferometer optical waveguides for respectively guiding said received supplemental interferometer reference and modulation optical signals; and
a supplemental interferometer output optical coupler for combining said first interferometer reference and modulation optical signals; and a primary output directional coupler means for receiving modulated optical signals from said interferometers, and generating therefrom a combined output optical signal having a power from each of said modulated optical signals selected in response to received primary command signals.

20. The electro-optic device of claim 1 wherein said modulation means further comprises first and second electrodes for presentation of said single modulation signal to optical signals propagating in modulation legs of said interferometers.

* * * * *